(12) United States Patent
Mallick et al.

(10) Patent No.: US 12,443,350 B2
(45) Date of Patent: Oct. 14, 2025

(54) STORAGE SYSTEM WITH NEGOTIATED REPLICATION OPTIMIZATION

(71) Applicant: Dell Products L.P., Round Rock, TX (US)

(72) Inventors: Sanjib Mallick, Bangalore (IN); Vinay G. Rao, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 18/591,266

(22) Filed: Feb. 29, 2024

(65) Prior Publication Data

US 2025/0278200 A1    Sep. 4, 2025

(51) Int. Cl.
G06F 3/06    (2006.01)

(52) U.S. Cl.
CPC .......... *G06F 3/0619* (2013.01); *G06F 3/0608* (2013.01); *G06F 3/065* (2013.01); *G06F 3/067* (2013.01)

(58) Field of Classification Search
CPC ...... G06F 3/0619; G06F 3/0608; G06F 3/065; G06F 3/067
See application file for complete search history.

(56) References Cited

U.S. PATENT DOCUMENTS

| | | | |
|---|---|---|---|
| 10,310,760 | B1 | 6/2019 | Dreier et al. |
| 10,893,105 | B1 | 1/2021 | Bono et al. |
| 11,550,511 | B2 | 1/2023 | Mallick et al. |
| 2003/0149773 | A1 | 8/2003 | Harbin et al. |
| 2009/0154472 | A1 | 6/2009 | Chung et al. |
| 2013/0054524 | A1* | 2/2013 | Anglin .............. G06F 16/27 707/624 |
| 2013/0198312 | A1 | 8/2013 | Tamir et al. |
| 2013/0226887 | A1 | 8/2013 | Braam et al. |
| 2015/0012607 | A1 | 1/2015 | Cayton et al. |
| 2017/0177222 | A1 | 6/2017 | Singh et al. |

(Continued)

OTHER PUBLICATIONS

Storpool Storage, "Demystifying: What is NVMeOF?" https://storpool.com/blog/demystifying-what-is-nvmeof, Sep. 12, 2017, 4 pages.

(Continued)

*Primary Examiner* — Jason W Blust
(74) *Attorney, Agent, or Firm* — Ryan, Mason & Lewis, LLP

(57) ABSTRACT

An apparatus includes at least one processing device comprising a processor coupled to a memory. The processing device is configured to send at least one command to a target storage system, to receive, in response to the at least one command, information characterizing one or more replication parameters supported by the target storage system, and to configure a replication process to replicate data from a source storage system to the target storage system utilizing at least a particular selected one of the one or more replication parameters supported by the target storage system. The command may comprise, for example, a Get Feature command that obtains a feature list providing the information characterizing the replication parameters supported by the target storage system. As another example, the command may comprise an Inquiry command that obtains a designated page providing the information characterizing the replication parameters supported by the target storage system.

20 Claims, 5 Drawing Sheets

(56) References Cited

U.S. PATENT DOCUMENTS

| | | | |
|---|---|---|---|
| 2017/0262185 A1* | 9/2017 | Long | G06F 3/0667 |
| 2020/0019521 A1 | 1/2020 | Solanki et al. | |
| 2020/0026606 A1 | 1/2020 | Farnum et al. | |
| 2022/0374167 A1 | 11/2022 | Mallick et al. | |
| 2023/0229314 A1 | 7/2023 | Chen et al. | |
| 2023/0297238 A1 | 9/2023 | Mallick et al. | |
| 2023/0325074 A1 | 10/2023 | Achkinazi et al. | |
| 2023/0325114 A1 | 10/2023 | Achkinazi et al. | |

OTHER PUBLICATIONS

Vmware, "VMware ESX Server," Product Datasheet, 2007, 4 pages.

Wikipedia, "Host Adapter," https://en.wikipedia.org/wiki/Host_adapter, Jul. 19, 2021, 4 pages.

Wikipedia, "iSCSI," https://en.wikipedia.org/wiki/ISCSI, Dec. 22, 2021, 10 pages.

Wikipedia, "NVM Express," https://en.wikipedia.org/wiki/NVM_Express, Jan. 13, 2022, 18 pages.

A. S. Gillis, "NVMe Over Fabrics (NVMe-oF)," https://searchstorage.techtarget.com/definition/NVMe-over-Fabrics-Nonvolatile-Memory-Express-over-Fabrics?vgnextfmt=print, Jan. 15, 2020, 5 pages.

Wikipedia, "Remote Direct Memory Access," https://en.wikipedia.org/wiki/Remote_direct_memory_access, Jan. 30, 2021, 3 pages.

M. Hoyt, "ScaleIO Tech Overview and Concepts: SDS-SAN vs SDS-Array," https://www.thinkahead.com/TheLAB/scaleio-tech-overview-concepts-sds-san-vs-sds-array/, Apr. 5, 2017, 16 pages.

EMC Corporation, "EMC ScaleIO Architectural and Functional Overview," EMC White Paper, Dec. 2013, 13 pages.

Dell EMC, "Dell EMC VxFlex OS: Networking Best Practices and Design Considerations," Dell EMC White Paper, Jul. 2018, 38 pages.

NVM Express, "NVM Express Base Specification, Revision 2.0c," NVM Express, Oct. 4, 2022, 458 pages.

Mellanox Technologies, "RoCE vs. iWARP Competitive Analysis," White Paper, Feb. 2017, 6 pages.

EMC Corporation, "EMC ScaleIO Design Considerations and Best Practices," EMC White Paper, Jun. 2016, 30 pages.

U.S. Appl. No. 17/964,560 filed in the name of Igor Achkinazi et al. on Oct. 12, 2022, and entitled "Host-Based Locality Determination Using Locality Log Pages."

U.S. Appl. No. 18/335,240 filed in the name of Igor Achkinazi et al. on Jun. 15, 2023, and entitled "Storage System with Automated Filtering of Discovery Information Utilizing Specified Configuration Domains."

* cited by examiner

85h - Compression/De-Compression of Write Payload

| Bits | Description |
|---|---|
| 31:03 | Reserved |
| 02:00 | Write Compression Supported: This field specifies write compression support and the particular algorithm used for write compression <table><tr><th>Value</th><th>Definition</th></tr><tr><td>000b</td><td>Not Supported</td></tr><tr><td>001b</td><td>Algorithm 1</td></tr><tr><td>010b</td><td>Algorithm 2</td></tr><tr><td>011b</td><td>Algorithm 3</td></tr><tr><td>100b to 111</td><td>Reserved</td></tr></table> |

FIG. 5

STORAGE SYSTEM WITH NEGOTIATED REPLICATION OPTIMIZATION

FIELD

The field relates generally to information processing systems, and more particularly to storage in information processing systems.

BACKGROUND

Storage arrays and other types of storage systems are typically accessed by host devices over a network. Applications running on the host devices each include one or more processes that issue input-output (IO) operations directed to particular logical storage volumes or other logical storage devices, for delivery by the host devices over selected paths to storage ports of the storage system. Different ones of the host devices can run different applications with varying workloads and associated IO patterns. Additional IO operations are typically generated in performing various data services such as replication of logical storage volumes. Various types of storage access protocols can be used by host devices to access the logical storage volumes or other logical storage devices of the storage system, including by way of example Small Computer System Interface (SCSI) storage access protocols and Non-Volatile Memory Express (NVMe) storage access protocols.

SUMMARY

Illustrative embodiments provide techniques for negotiated optimization of replication bandwidth and/or other replication parameters in storage systems, in some cases using modified versions of at least one of the above-noted NVMe and SCSI storage access protocols, although it is to be appreciated that other storage access protocols can be supported in other embodiments. The storage systems illustratively include a source storage system that participates in a replication process, such as an asynchronous replication process, with a target storage system. The source and target storage systems may comprise storage arrays, distributed storage systems, cloud-based storage systems and/or other types of storage systems, in any combination. In some embodiments, a host device may control one or more aspects of a given replication process, although the disclosed techniques are more generally applicable to any type of replication process, including storage-side replication processes without any host device involvement.

In order to achieve a desired recovery point objective (RPO) for a given replication process, it is important to establish an appropriate replication bandwidth and/or other replication parameters between source and target storage systems. Unfortunately, conventional approaches are deficient in this regard, leading to inefficient use of available resources as well as difficulties in achieving desired RPOs.

Illustrative embodiments disclosed herein overcome these and other drawbacks of conventional approaches by providing techniques for negotiated replication optimization in an information processing system comprising source and target storage systems that carry out replication processes.

Such embodiments advantageously address and alleviate problems that might otherwise arise absent such negotiated replication optimization, thereby providing more efficient use of resources as well as facilitating achievement of desired RPOs.

In one embodiment, an apparatus comprises at least one processing device that includes a processor coupled to a memory. The at least one processing device is configured to send at least one command to a target storage system, to receive, in response to the at least one command, information characterizing one or more replication parameters supported by the target storage system, and to configure a replication process to replicate data from a source storage system to the target storage system utilizing at least a particular selected one of the one or more replication parameters supported by the target storage system.

The at least one processing device in some embodiments comprises at least a portion of the source storage system.

Additionally or alternatively, the at least one processing device in some embodiments may comprise at least a portion of a host device coupled to the source storage system and the target storage system.

In some embodiments, the at least one command is sent to the target storage system utilizing a command format of one of an NVMe storage access protocol and a SCSI storage access protocol. This illustratively involves utilizing new commands of the type disclosed herein, that are not currently part of the NVMe and SCSI storage access protocols, but that utilize a command format of those respective storage access protocols, and therefore may be deployed in some embodiments in modified versions of these or possibly other existing storage access protocols.

For example, in embodiments that utilize a command format of an NVMe storage access protocol, the at least one command illustratively comprises a Get Feature command and the received information comprises a feature list providing the information characterizing the one or more replication parameters supported by the target storage system.

As another example, in embodiments that utilize a command format of a SCSI storage access protocol, the at least one command illustratively comprises an Inquiry command and the received information comprises a designated page providing the information characterizing the one or more replication parameters supported by the target storage system.

In some embodiments, the information characterizing one or more replication parameters supported by the target storage system illustratively comprises information characterizing one or more compression-related replication parameters supported by the target storage system, such as, for example, at least one compression algorithm supported by the target storage system, at least one compression level supported by the target storage system and/or at least one buffer size supported by the target storage system.

Additionally or alternatively, the information characterizing one or more replication parameters supported by the target storage system illustratively comprises information characterizing one or more encryption-related replication parameters supported by the target storage system, such as, for example, at least one encryption algorithm supported by the target storage system.

The disclosed arrangements in illustrative embodiments can significantly improve storage system performance by, for example, ensuring that a source storage system participating in a replication process with a target storage system can determine in advance the supported capabilities of the target storage system in terms of compression-related replication parameters, encryption-related replication parameters and/or possibly additional or alternative replication parameters, and can select particular ones of the supported capabilities for use in the replication process, in a manner that optimizes or otherwise enhances the performance of the replication process, so as to facilitate the achievement of a given RPO for the replication process and its one or more associated replication sessions.

These and other illustrative embodiments include, without limitation, apparatus, systems, methods and computer program products comprising processor-readable storage media.

BRIEF DESCRIPTION OF THE DRAWINGS

FIG. 5 shows an example Inquiry page for use in a negotiated replication optimization carried out between source and target arrays utilizing a modified version of a SCSI storage access protocol in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
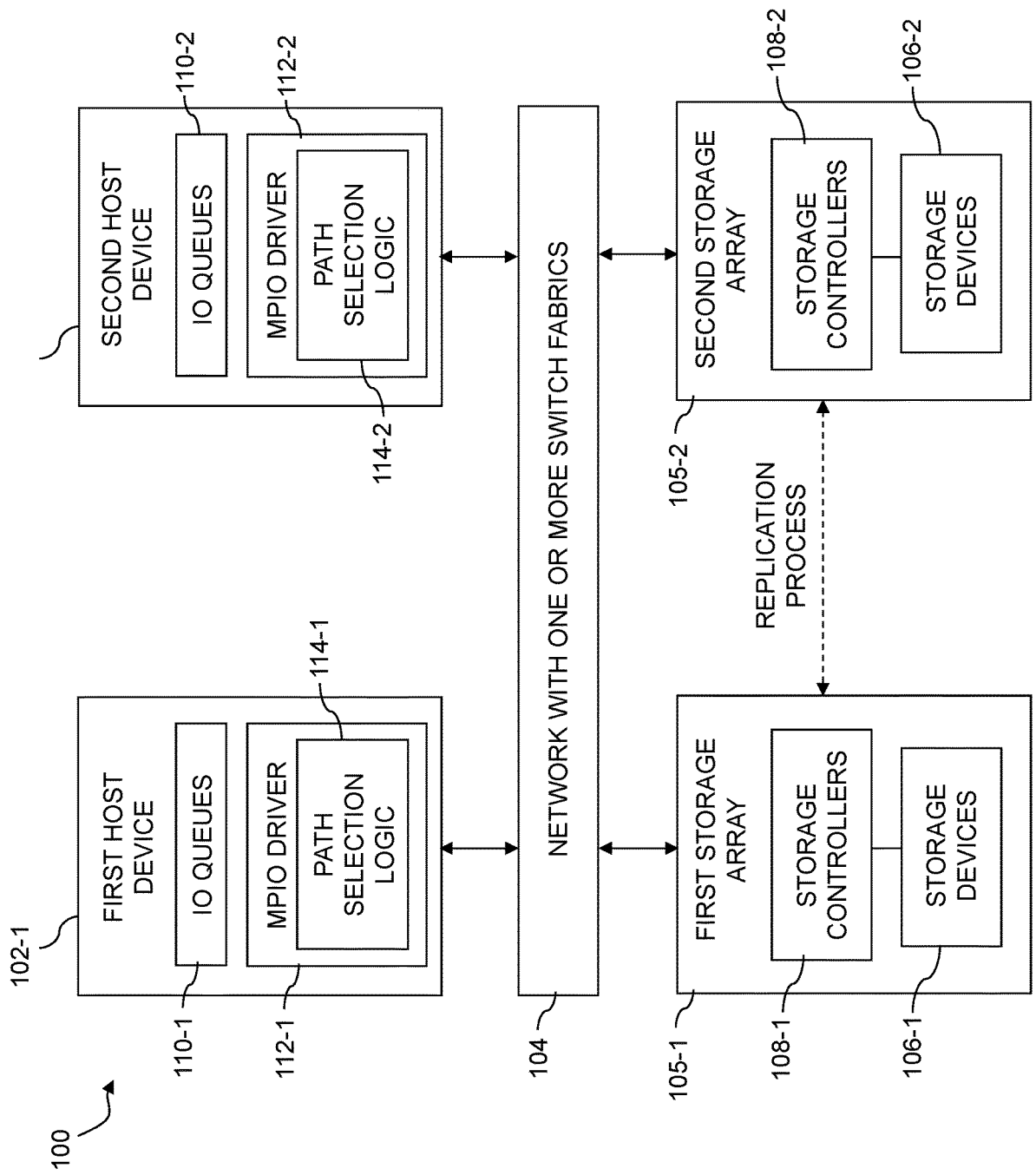
FIG. 1 is a block diagram of an information processing system configured with functionality for negotiated replication optimization in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, also collectively referred to herein as first and second storage arrays 105, or simply storage arrays 105. For example, in some embodiments the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANS, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device and/or a single storage array.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The first and second storage arrays 105-1 and 105-2 comprise respective sets of storage devices 106-1 and 106-2, collectively referred to herein as storage devices 106, coupled to respective sets of storage controllers 108-1 and 108-2, collectively referred to herein as storage controllers 108. The storage controllers 108 may comprise, for example, storage processors, service processors, and/or other arrangements of processing circuitry configured to process IO operations received by the corresponding storage array. The term "storage controller" as used herein is therefore intended to be broadly construed, so as to encompass these and other arrangements, such as processing devices that are more particularly referred to herein as storage array processors. Each of the storage controllers 108 illustratively has one or more ports associated therewith for supporting communications between the storage arrays 105 and the host devices 102 over the network 104.

The storage devices 106 may be viewed as illustrative examples of what are more generally referred to herein as "backend storage devices" of the storage arrays 105. Such storage devices in the FIG. 1 embodiment are illustratively shown as being located within their respective corresponding storage arrays, but in other embodiments may be located at least in part externally to their respective corresponding storage arrays.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, and spin torque transfer magneto-resistive RAM (STT-MRAM). These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices. In some embodiments, at least one of the storage arrays 105 illustratively comprises one or more PowerMax™ or PowerStore™ storage arrays, commercially available from Dell Technologies.

As another example, one or both of the storage arrays 105 may comprise respective distributed storage systems, each including a plurality of storage nodes interconnected by one or more networks. An example of a distributed storage system of this type is a scale-out all-flash content addressable storage array distributed over multiple storage nodes.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (ISCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 illustratively implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104. The above-noted LUNs are examples of what are more generally referred to herein as logical storage volumes, or still more generally, logical storage devices.

The read and write commands in some embodiments more particularly comprise SCSI commands, although other types of commands may be used in other embodiments, including commands that are part of a standard command set, such as NVMe commands, or custom commands such as a "vendor unique command" or VU command that is not part of a standard command set.

A given IO operation as that term is broadly used herein illustratively comprises one or more such commands. References herein to terms such as "input-output" and "IO"

should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by one of the host devices 102 to one of the storage arrays 105 is considered an "outstanding" command until such time as its execution is completed in the viewpoint of the sending host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes.

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

As a more particular example, the host devices 102 in some embodiments illustratively comprise an ESXi environment or other type of host environment that supports non-disruptive movement of applications between ESXi servers or other types of servers, possibly using vMotion or other similar techniques to move VMs, in which those application execute, from one server to another server.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with the NVMe storage access protocol, as described in the NVM Express Base Specification, Revision 2.0c, October 2022, and its associated NVM Express Command Set Specification and NVM Express TCP Transport Specification, all of which are incorporated by reference herein. Other storage access protocols of this type that may be utilized in illustrative embodiments disclosed herein include NVMe over Fabric, also referred to as NVMe-OF, and NVMe over Transmission Control Protocol (TCP), also referred to as NVMe/TCP.

In some embodiments, the storage arrays 105 may be arranged in a configuration in which one of the storage arrays 105 is designated as a local storage array relative to at least one of the host devices 102, and the other one of the storage arrays 105 is designated as a remote storage array relative to at least one of the host devices 102. For example, the storage arrays may be arranged in a metro and/or stretched ("metro/stretched") configuration or other active-active configuration, or another type of configuration relative to one another that involves local-remote designations.

As a more particular illustration, the first and second storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The first and second storage arrays 105-1 and 105-2 in some embodiments are illustratively configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

An example asynchronous replication process operates over multiple sequential intervals, and for each interval transmits differential data that represent changed data of one or more logical storage volumes of a consistency group, relative to a previous interval.

Other examples of replication processes include various types of snapshot-based replication processes such as those referred to elsewhere herein.

Moreover, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes. A given replication process can include one or more replication sessions, each illustratively involving one or more source-target logical storage volume pairs or other types of arrangements of consistency groups.

A more particular example of a snapshot-based replication process operates in the following manner, as carried out between the first storage array 105-1 as a source array and the second storage array 105-2 as a target array. In this example, it is assumed without limitation that the first storage array 105-1 implements a snapshot-based replication process, in which an orchestrator of the first storage array 105-1 issues replication IO operations to local or network-attached backend storage devices and then forwards corresponding replication IOs to a remote system, illustratively the second storage array 105-2. Such an orchestrator illustratively comprises an IO forwarding engine, and may be implemented at least in part using one or more of the storage controllers 108-1 of the first storage array 105-1. While the above-noted snapshot-based replication process is running, the first storage array 105-1 also receives host IO operations from one or more of the host devices 102-1.

Consider by way of example two flows of IO operations in the first storage array 105-1. The first flow includes host IOs coming from a host and being put into a storage queue to be sent over an internal storage network to one or more internal storage servers so as to access backend storage devices. When a reply to a given such host IO comes back over the internal storage network, this host IO is posted into a first outgoing queue, back to the host. The first outgoing queue back to the host is an example of what is also referred to as a completion queue of the first storage array 105-1.

The second flow includes replication IOs associated with snapshot-based replication orchestration. Such replication IOs are also put into a storage queue to be sent over the internal storage network to the one or more internal storage servers in order to access the backend storage devices. When a reply to a given such replication IO comes back over the internal storage network, this replication IO is posted into a second outgoing queue, towards the remote system, illustratively the second storage array 105-2. The second outgoing queue towards the remote system is an example of what is also referred to as a replication queue of the first storage array 105-1. Again, this is only an example of a snapshot-based replication process, and numerous other replication processes may be used.

A given logical storage device implemented on one or both of the storage arrays 105 in the system 100 illustratively comprises a set of one or more LUNs or other logical storage volumes of one or both of the storage arrays 105. Each such LUN or other logical storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides path selection functionality for host IO operations using respective instances of path selection logic 114-1 and 114-2 implemented within the MPIO drivers 112.

The MPIO drivers 112 may comprise, for example, otherwise conventional MPIO drivers, such as PowerPath® drivers from Dell Technologies. Other types of MPIO drivers from other driver vendors may be used in illustrative embodiments herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Such IO operations generated by application processes executing on the host device 102-1 are considered examples of what are more generally referred to herein as "host IO operations." Host IO operations are distinguished herein from additional IO operations associated with one or more replication processes, which are more generally referred to herein as "replication IO operations." References herein to IO operations generally should be understood to refer to host IO operations unless otherwise indicated.

The paths over which the IO operations are sent from the host device 102-1 to the storage arrays 105 illustratively comprise paths associated with respective initiator-target pairs, with each initiator comprising a port of a single-port or multi-port host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device port and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical storage device of one of the storage arrays 105. The corresponding logical storage device illustratively comprises a LUN or other logical storage volume to which the particular IO operation is directed.

A given retry of a failed IO operation under such a path selection algorithm can select a path having a different host device port and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104. The MPIO driver 112-2 of host device 102-2 is assumed to be similarly configured.

Aspects of negotiated replication optimization implemented in information processing system 100 will now be described in greater detail. It is to be appreciated that terms such as "optimization" as used herein should not be viewed as requiring any particular optimal condition, such as particular absolute minimum or maximum values of performance metrics, but are instead intended to be broadly construed, so as to encompass, for example, a wide variety of arrangements in which replication performance is improved through the disclosed negotiation of replication parameters, relative to what it would otherwise be absent the disclosed negotiation of replication parameters. Also, terms such as "negotiated" are intended to be broadly construed to encompass, for example, arrangements in which a target storage system provides a range of available replication parameters to a source storage system and the source storage system selects, from the range of available replication parameters provided by the target storage system, one or more particular replication parameters for use in at least one replication session or other replication process.

As indicated above, in order to achieve a desired RPO for a given replication process, it is important to establish an appropriate replication bandwidth and/or other replication parameters between source and target storage systems. Unfortunately, conventional approaches are deficient in this regard, leading to inefficient use of available resources as well as difficulties in achieving desired RPOs.

Illustrative embodiments disclosed herein overcome these and other drawbacks of conventional approaches by providing techniques for negotiated replication optimization in an information processing system comprising source and target storage systems that carry out replication processes. Such embodiments address and alleviate problems that might otherwise arise absent such negotiated replication optimization, thereby providing more efficient use of resources as well as facilitating achievement of desired RPOs.

A given replication RPO is generally highly dependent on the amount of replication data transmitted between the source and target storage systems. For example, a distributed storage system typically distributes chunks or other blocks of data of one or more logical storage volumes over a plurality of storage nodes. As part of an example asynchronous replication process, differential data between snapshots of one or more logical storage volumes of a consistency group may be created by consolidating modified blocks of data from each of at least a subset of the storage nodes participating in the replication process. One or more of the storage nodes each illustratively includes a replication engine to transmit the differential data from the source storage system to the target storage system.

In some cases, the target storage system is a remote storage system relative to the source storage system. For example, the source storage system may be an enterprise storage system and the target storage system may be a cloud-based storage array or other type of cloud-based storage system.

It is generally desirable to minimize the amount of bandwidth required for the transmission of the differential data from the source storage system to the target storage system, illustratively utilizing compression and/or other related functionality.

The transport of the differential data from the source storage system to the target storage system may take place using a standard storage access protocol such as SCSI or NVMe. The latter may more particularly comprise NVMe/TCP. The target storage system receives the differential data from the source storage system and applies it to the one or more corresponding remote logical storage volumes that are part of the consistency group of the replication process. The target storage system and the source storage system will then both have the same snapshot of the logical storage volumes of the consistency group.

Under conventional practice, it is generally not possible to optimize the replication bandwidth between the source and target storage system based on current values of replication parameters of the target storage system. This is due at least in part to the fact that it is unduly difficult in many scenarios for the source storage system to obtain such information from the target storage system. For example, existing implementations of the SCSI or NVMe storage access protocols, as well as other conventional storage access protocols, generally do not include adequate functionality for obtaining such information, such as obtaining in a source storage system current values of compression-related replication parameters or other replication parameters of a target storage system.

Some embodiments disclosed herein address these and other drawbacks of conventional practice by providing techniques for negotiated optimization of replication bandwidth and/or other replication parameters in storage systems, possibly using modified versions of at least one of the above-noted NVMe and SCSI storage access protocols, although it is to be appreciated that other storage access protocols can be supported in other embodiments.

For example, the source and target storage systems can differ considerably in terms of available features such as compression, encryption and other functionality relating to data mobility in the replication context.

In some embodiments, the target storage system capabilities in terms of compression, encryption and/or other functionality relating to replication are exposed to the source storage system in a generic, in-band and potentially standardizable manner, illustratively utilizing modified versions of the SCSI and/or NVMe storage access protocols, or possibly other types of storage access protocols. Using this approach, the source and target storage systems can collectively determine the optimal manner in which to transfer replication data from the source storage system to the target storage system.

The above-described negotiated replication optimization functionality is illustratively implemented in the system 100 in the following manner. It should be noted that the term "replication bandwidth" as used herein is intended to be broadly construed so as to encompass, for example, an amount of data transmission capacity that is needed to replicate data from source to target for at least a portion of a replication session or other replication process. The replication bandwidth is determined by factors such as the amount of data to be replicated, what type of compression is used if any, what type of encryption is used if any, and possibly additional or alternative factors. These example factors and other possible determinants of replication bandwidth may be viewed as comprising examples of "replication parameters" as that term is broadly used herein.

The system 100 illustratively comprises at least one processing device that includes a processor coupled to a memory. The at least one processing device is configured to send at least one command to a target storage system, to receive, in response to the at least one command, information characterizing one or more replication parameters supported by the target storage system, and to configure a replication process to replicate data from a source storage system to the target storage system utilizing at least a particular selected one of the one or more replication parameters supported by the target storage system.

The at least one processing device in some embodiments comprises at least a portion of the source storage system. The source and target storage systems illustratively comprise the respective first and second storage arrays 105-1 and 105-2 of the system 100.

Additionally or alternatively, the at least one processing device in some embodiments may comprise at least a portion of a host device coupled to the source storage system and the target storage system, such as a particular one of the host devices 102 coupled to the first and second storage arrays 105-1 and 105-2 via the network 104.

It will be assumed for the following description that the source storage system comprises the first storage array 105-1 and the target storage system comprises the second storage array 105-2, although it is possible for replication to be performed in the opposite direction, with data being replicated from the second storage array 105-2 to the first storage array 105-1.

In some embodiments, the at least one command is sent from the first storage array 105-1 to the second storage array 105-2 utilizing a command format of one of an NVMe storage access protocol and a SCSI storage access protocol. This illustratively involves utilizing new commands of the type disclosed herein, that are not currently part of the NVMe and SCSI storage access protocols, but that utilize a command format of those respective storage access protocols, and therefore may be deployed in some embodiments in modified versions of these or possibly other existing storage access protocols.

For example, in embodiments that utilize a command format of an NVMe storage access protocol, the at least one command illustratively comprises a Get Feature command and the received information comprises a feature list providing the information characterizing the one or more replication parameters supported by the second storage array 105-2. A more detailed example of such a Get Feature command and its associated feature list will be described below in conjunction with FIG. 4.

As another example, in embodiments that utilize a command format of a SCSI storage access protocol, the at least one command illustratively comprises an Inquiry command and the received information comprises a designated page providing the information characterizing the one or more replication parameters supported by the second storage array 105-2. A more detailed example of such an Inquiry command and its associated page will be described below in conjunction with FIG. 5.

In some embodiments, the information characterizing one or more replication parameters supported by the second storage array 105-2 illustratively comprises information characterizing one or more compression-related replication parameters supported by the second storage array 105-2, such as, for example, at least one compression algorithm supported by the second storage array 105-2, at least one compression level supported by the second storage array 105-2 and/or at least one buffer size supported by the second storage array 105-2.

Additionally or alternatively, the information characterizing one or more replication parameters supported by the second storage array 105-2 illustratively comprises information characterizing one or more encryption-related replication parameters supported by the second storage array 105-2, such as, for example, at least one encryption algorithm supported by the second storage array 105-2.

In some embodiments, the information characterizing the one or more compression-related replication parameters illustratively comprises a range of selectable options for at least one of the one or more compression-related replication parameters supported by the second storage array 105-2 and the particular selected one of the one or more replication parameters is selected by the first storage array 105-1 from the range of selectable options.

Additionally or alternatively, the first storage array 105-1 in some embodiments is further configured to push a replication data transmission contract to the second storage array 105-2, with the replication data transmission contract specifying at least the particular selected one of the one or more replication parameters supported by the second storage array 105-2 that will be utilized in replicating data as part of the replication process.

For example, the replication data transmission contract illustratively specifies at least one of a particular compression algorithm supported by the second storage array 105-2 that will be utilized in replicating data as part of the replication process, a particular compression level supported by the second storage array 105-2 that will be utilized in replicating data as part of the replication process and/or a particular buffer size supported by the second storage array 105-2 that will be utilized in replicating data as part of the replication process.

In some embodiments, separate instances of the replication data transmission contract are generated by the first storage array 105-1 and pushed to the second storage array 105-2 for each of a plurality of source-target logical storage volume pairs that are subject to the replication process. Such source-target logical storage volume pairs may be viewed as an example of a "consistency group" as that term is broadly used herein.

The replication data transmission contract is illustratively considered valid once it is pushed by the first storage array 105-1 to the second storage array 105-2, and automatically remains valid for a corresponding replication session of the replication process.

The disclosed arrangements in illustrative embodiments can significantly improve storage system performance by, for example, ensuring that the first storage array 105-1 participating in a replication process with second storage array 105-2 can determine in advance the supported capabilities of the second storage array 105-2 in terms of compression-related replication parameters, encryption-related replication parameters and/or possibly additional or alternative replication parameters, and can select particular ones of the supported capabilities for use in the replication process, in a manner that optimizes or otherwise enhances the performance of the replication process, so as to facilitate the achievement of a given RPO for the replication process and its one or more associated replication sessions.

Additional detailed examples will now be described in the context of storage arrays 105 of system 100, but can be adapted for use with a wide variety of other types of storage systems and host devices.

In an illustrative embodiment, prior to sending a given set of differential data in an example asynchronous replication process, the first storage array 105-1 can read the current capabilities of the second storage array 105-2, and adjust the manner in which it sends the given set of differential data based at least in part on the obtained information, utilizing the negotiated replication optimization techniques disclosed herein. The first storage array 105-1 illustratively utilizes new commands of the type disclosed herein to obtain this information from the second storage array 105-2. Such commands are suitable for implementation in modified versions of the existing NVMe or SCSI standards, or for implementation in other storage access protocols, as disclosed herein. The obtained information in some embodiments comprises current values of compression-related replication parameters of the second storage array 105-2, as read from the second storage array 105-2 using the above-noted commands.

Examples of compression-related replication parameters illustratively include one or more of the following, although it is to be appreciated that additional or alternative parameters could be used in other embodiments:

1. General compression support. For example, a designated bit=1 means compression is supported by the second storage array 105-2, and the designated bit=0 means compression is not supported by the second storage array 105-2.
2. Particular compression algorithm(s) supported. For example, the second storage array 105-2 may support one or more compression algorithms, such as Lempel-Ziv 77 (LZ77) and/or Lempel-Ziv-Markov chain Algorithm (LZMA), etc.
3. Compression level for an algorithm. For example, the second storage array 105-2 may support levels 0-9 for LZ77.
4. Maximum buffer size that the second storage array 105-2 is capable of providing for storing decompressed data.

In some embodiments utilizing a modified version of the SCSI storage access protocol, a new Inquiry (INQ) page is provided that stores the compression-related replication parameters, such as an INQ page 85h, and the first storage array 105-1 can read the new INQ page using SCSI INQ commands to obtain the current values of the compression-related replication parameters. Such a page may be used by the second storage array 105-2 to "publish" its current compression capabilities to the first storage array 105-1, so that the first storage array 105-1 can adapt the manner in which it transfers replication data accordingly, thereby optimizing replication bandwidth.

For example, the first storage array 105-1 can send a Mode Select command to the second storage array 105-2 confirming the particular values that will be used in the transfer of replication data, thereby in effect forming a signed data mobility transmission contract between the storage arrays 105.

In some embodiments utilizing a modified version of the NVMe storage access protocol, a new Get Feature command is provided to include new feature identifiers for compression-related replication parameters. For example, a feature list comprising current values of such feature identifiers may be obtained by the first storage array 105-1 by sending the corresponding Get Features command to the second storage array 105-2.

The first storage array 105-1 can then send a Set Features command to second storage array 105-2 confirming the particular values that will be used in the transfer of replication data, thereby in effect forming a signed data mobility transmission contract between the storage arrays 105.

A contract of the type described above can be valid for a given source-target logical storage volume pair, or for sets of multiple such pairs, illustratively associated with a given consistency group of the replication process. Different contracts with different compression-related replication parameters or other replication parameters can therefore be established for different source-target logical storage volume pairs. A given such contract can be valid for the one or more associated logical storage volume pairs for as long as a given replication process or associated replication session is active. It can be periodically renegotiated, possibly within a given replication process (e.g., prior to each significant transfer of replication data) such that the optimal replication parameters continue to be used for the transfer of replication data from the first storage array 105-1 to the second storage array 105-2.

These and other aspects of the negotiated replication optimization functionality of the first storage array 105-1 and the second storage array 105-2 are illustratively performed at least in part by or under the control of their respective storage controllers 108-1 and 108-2. Such a storage controller is considered an illustrative example of what is more generally referred to herein as "at least one processing device" comprising a processor coupled to a memory.

Accordingly, at least one processing device as that term is broadly used herein illustratively comprises at least a portion of the first storage array 105-1, such as one or more storage controllers 108-1 of the first storage array 105-1, although numerous other arrangements of one or more processing devices, each comprising processor and memory components, are possible.

Again, the particular negotiated replication optimization functionality described above can be varied in other embodiments. For example, the computations and associated priority adjustments can be varied.

As indicated above, at least portions of the functionality for negotiated replication optimization in illustrative embodiments is implemented within or otherwise utilizing the storage controllers 108 of the first and second storage arrays 105. For example, one or more such storage controllers 108 are illustratively configured to control performance of one or more steps of the example process to be described below in conjunction with FIG. 2, possibly with the use of associated replication optimization logic.

Although one or more of the storage controllers 108 are utilized to perform certain aspects of the functionality for negotiated replication optimization in some embodiments, this is by way of illustrative example only, and other embodiments need not utilize storage controllers in implementing such functionality. For example, additional or alternative logic circuitry and/or system components can be configured to implement aspects of the functionality for negotiated replication optimization in other embodiments.

It is assumed that the second storage array 105-2 is configured in a manner similar to that described above and elsewhere herein for the first storage array 105-1. The second storage array 105-2 is therefore similarly configured to perform at least portions of the disclosed functionality for negotiated replication optimization. Moreover, aspects of functionality for negotiated replication optimization described above in the context of the first storage array 105-1 and its storage controllers 108-1 in some embodiments can be similarly performed by the other storage array 105-2 and its storage controllers 108-2.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, storage controllers 108, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, additional or alternative logic instances or other components implemented in the storage arrays 105 can be used to perform at least portions of the functionality for negotiated replication optimization.

The operation of the information processing system 100 will now be described in further detail with reference to the flow diagram of the illustrative embodiment of FIG. 2. The process as shown includes steps 200 through 204, and is suitable for use in conjunction with a replication process carried out between storage arrays 105-1 and 105-2 in the system 100, but is more generally applicable to other types of information processing systems comprising at least first and second storage systems, illustratively referred to as respective source and target arrays in this embodiment.

Figure 2:
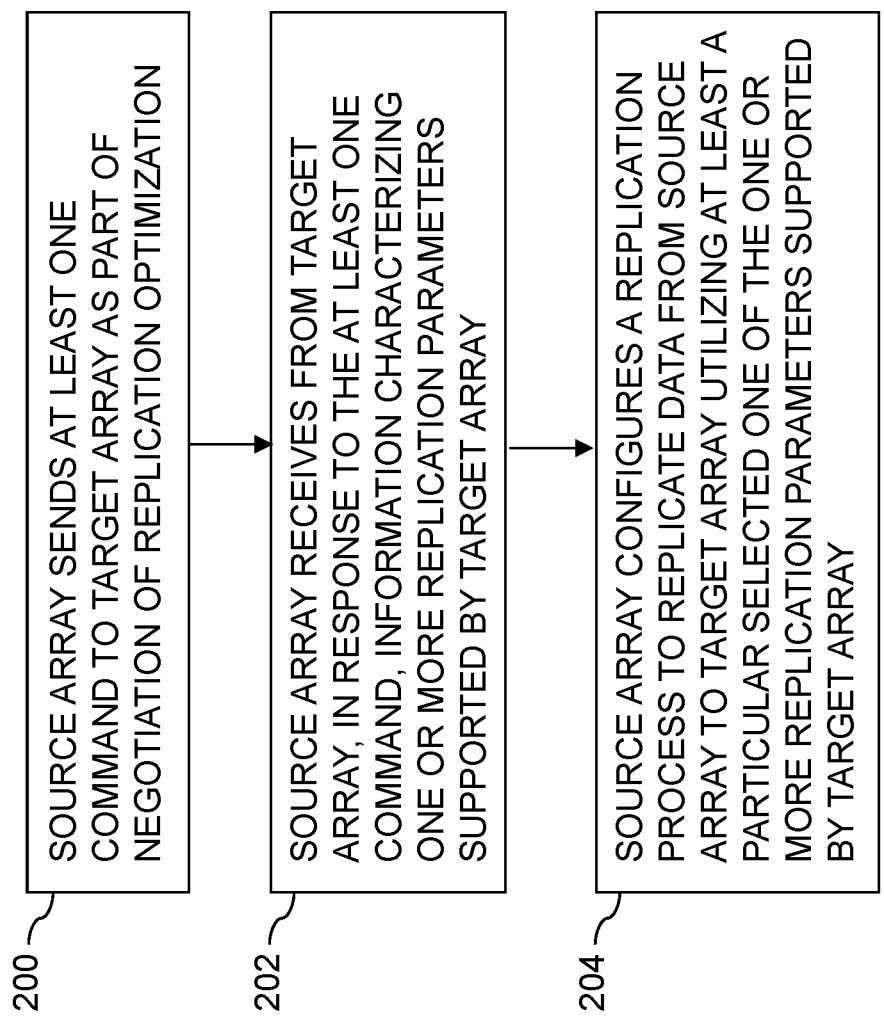
FIG. 2 is a flow diagram illustrating an example process for negotiated replication optimization in an illustrative embodiment.

Also, although the example process of FIG. 2 is illustratively carried out between source and target storage arrays, in other embodiments a similar process can be carried out with the involvement of at least one host device, such as a given one of the first and second host devices 102-1 and 102-2 of system 100.

The steps of the FIG. 2 process are illustratively performed at least in part by or under the control of storage controllers of respective first and second storage systems, such as the storage controllers 108-1 and 108-2 of the respective first and second storage arrays 105-1 and 105-2 of the system 100, although other arrangements of system components can control or perform at least portions of one or more of the steps in other embodiments. The process may be viewed as an example of an algorithm implemented by instances of replication optimization logic of the first and second storage arrays 105-1 and 105-2, where such logic is illustratively deployed in the storage controllers 108-1 and 108-2.

In step 200, a source array sends at least one command to a target array as part of a negotiation of replication optimization. For example, in embodiments utilizing a modified version of an NVMe storage access protocol as disclosed herein, the at least one command can comprise a Get Feature command. In other embodiments utilizing a modified version of a SCSI storage access protocol as disclosed herein, the at least one command can comprise an Inquiry command. Numerous other types of commands, including non-NVMe and non-SCSI commands, can also be used.

In step 202, the source array receives from the target array, in response to the at least one command, information characterizing one or more replication parameters supported by the target array. In the case of the above-noted Get Feature command, the received information illustratively comprises a feature list providing the information characterizing the one or more replication parameters supported by the target storage system. In the case of the above-noted Inquiry command, the received information illustratively comprises a designated page providing the information characterizing the one or more replication parameters supported by the target storage system.

In step 204, the source array configures a replication process to replicate data from the source array to the target array utilizing at least a particular selected one of the one or more replication parameters supported by the target array. The source array in some embodiments confirms the particular selected replication parameters by pushing a replication data transmission contract to the target array, as described elsewhere herein. For example, in the case of the above-noted Get Feature command, a replication data transmission contract can be pushed from the source array to the target array using a Set Features command. In the case of the above-noted Inquiry command, a replication data transmission contract can be pushed from the source array to the target array using a Mode Select command. Again, other types of commands can be used in other embodiments.

The replication process may involve replicating one or more logical storage volumes from the source array to the target array, where the source array illustratively comprises a production storage array and the target array illustratively comprises a remote storage array or other type of backup storage array. The replication process can comprise a host-side replication process that is controlled primarily by one or more host devices, a storage-side replication process that is controlled primarily by one or more of the first and second storage systems, or a hybrid process in which one or more host devices and one or more of the first and second storage systems collaborate with one another in controlling the replication process. The term "replication process" as used herein is therefore intended to be broadly construed, so as to encompass any of a wide variety of different arrangements involving replication of data between storage systems, including by way of example various types of snapshot-based replication processes, and may involve one or more replication sessions.

Steps 200 through 204 may be repeated for different replication sessions, replication processes and/or consistency groups. A given such consistency group may comprise, for example, one or more logical storage volumes that are designated for replication from the source array to the target array.

The steps of the FIG. 2 process are shown in sequential order for clarity and simplicity of illustration only, and certain steps can at least partially overlap with other steps. Also, different ones of the steps can be performed at least in part by different storage array components, such as additional or alternative components of the storage array.

As indicated above, different instances of the FIG. 2 process can execute at least in part in parallel with one another for different replication sessions, replication processes and/or consistency groups. Additionally or alternatively, multiple additional instances of the FIG. 2 process can be performed for respective ones of one or more additional source arrays and/or target arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for negotiated replication optimization. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different negotiated replication optimization processing arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
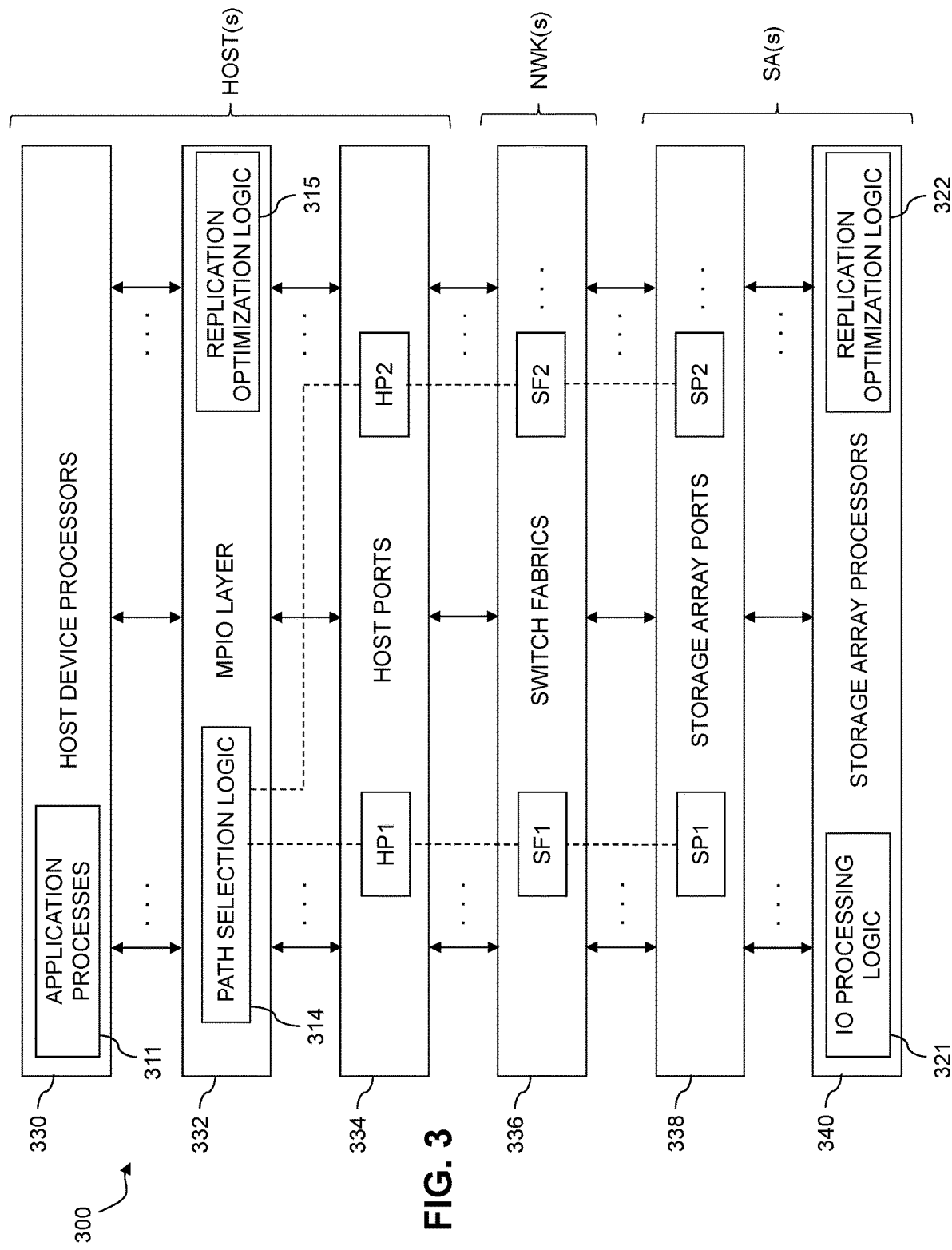
FIG. 3 is a block diagram showing multiple layers of a layered system architecture that includes functionality for negotiated replication optimization in an illustrative embodiment.

Referring now to FIG. 3, another illustrative embodiment is shown. In this embodiment, an information processing system 300 comprises host-side components that include path selection logic 314 and replication optimization logic 315, and storage-side components that include IO processing logic 321 and replication optimization logic 322. Additional or alternative host-side and storage-side components can be used in other embodiments. The system 300 is configured in accordance with a layered system architecture that illustratively includes a host device processor layer 330, an MPIO layer 332, a host port layer 334, a switch fabric layer 336, a storage array port layer 338 and a storage array processor layer 340. As illustrated in the figure, the host device processor layer 330, the MPIO layer 332 and the host port layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements functionality for negotiated replication optimization for host IO operations and replication IO operations. The host IO operations are illustratively generated by one or more application processes 311 running in one or more host device processors of the host device processor layer 330. The replication IO operations are illustratively generated in conjunction with a snapshot-based replication process or other type of replication process that involves replicating data from one storage array to another storage array, such as from a production storage array to a backup storage array.

The functionality for negotiated replication optimization in this embodiment is assumed to be controlled at least in part by at least one of the replication optimization logic 315 and the replication optimization logic 322, although other arrangements are possible.

The negotiated replication optimization functionality is assumed to include, for example, at least one of a host device and a source storage array sending at least one command to a target storage array, receiving, in response to the at least one command, information characterizing one or more replication parameters supported by the target storage array, and configuring a replication process to replicate data from the source storage array to the target storage array utilizing at least a particular selected one of the one or more replication parameters supported by the target storage array.

Accordingly, the replication process in some embodiments is controlled at least in part by replication optimization logic 315 in a host device and in other embodiments is controlled at least in part by an instance of replication optimization logic 322 in the source storage array. The target storage array is also assumed to comprise an instance of replication optimization logic 322, for controlling at least a portion of its interactions with the source storage array in implementing negotiated replication optimization as disclosed herein.

The path selection logic 314 and replication optimization logic 315 can include multiple distinct path selection logic instances for respective ones of a plurality of host devices of the system 300.

Also, although replication optimization logic 322 is illustratively shown as being implemented in the storage array processor layer 340, it can instead be implemented at least part elsewhere within the one or more storage arrays, such as in one or more devices associated with the storage array ports of the storage array port layer 338.

The IO processing logic 321 implemented in the storage array processor layer 340 performs various types of processing for servicing of read requests, write requests and other types of IO operations received from one or more host devices of the system 300. The replication optimization logic 322 illustratively implements negotiated replication optimization for host IO operations and replication IO operations as described previously. In some embodiments, there may be separate instances of the IO processing logic 321 and the replication optimization logic 322 for each of a plurality of storage arrays of the system 300.

The host-side components including path selection logic 314 operate in conjunction with the storage-side components including IO processing logic 321 and replication optimization logic 322 to implement at least portions of the functionality for negotiated replication optimization as disclosed herein.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300, as previously described. As indicated above, the path selection logic 314 in some embodiments operates in conjunction with the IO processing logic 321 and the replication optimization logic 322 in implementing at least portions of the functionality for negotiated replication optimization as disclosed herein. Additional or alternative layers and logic circuitry arrangements can be used in other embodiments.

In the system 300, path selection logic 314 is configured to select different paths for sending IO operations from a given host device to a storage array. These paths as illustrated in the figure include a first path from a particular host port denoted HP1 through a particular switch fabric denoted SF1 to a particular storage array port denoted SP1, and a second path from another particular host port denoted HP2 through another particular switch fabric denoted SF2 to another particular storage array port denoted SP2.

These two particular paths are shown by way of illustrative example only, and in many practical implementations there will typically be a much larger number of paths between the one or more host devices and the one or more storage arrays, depending upon the specific system configuration and its deployed numbers of host ports, switch fabrics and storage array ports. For example, each host device in the FIG. 3 embodiment can illustratively have a set of multiple paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the storage arrays of system 300, through their respective instances of components 321 and 322, provide functionality for negotiated replication optimization as disclosed herein, illustratively with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of host ports to accommodate predicted performance needs. In some cases, the number of host ports per host device is on the order of 4, 8 or 16 host ports, although other numbers of host ports could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The host ports of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Figure 4:
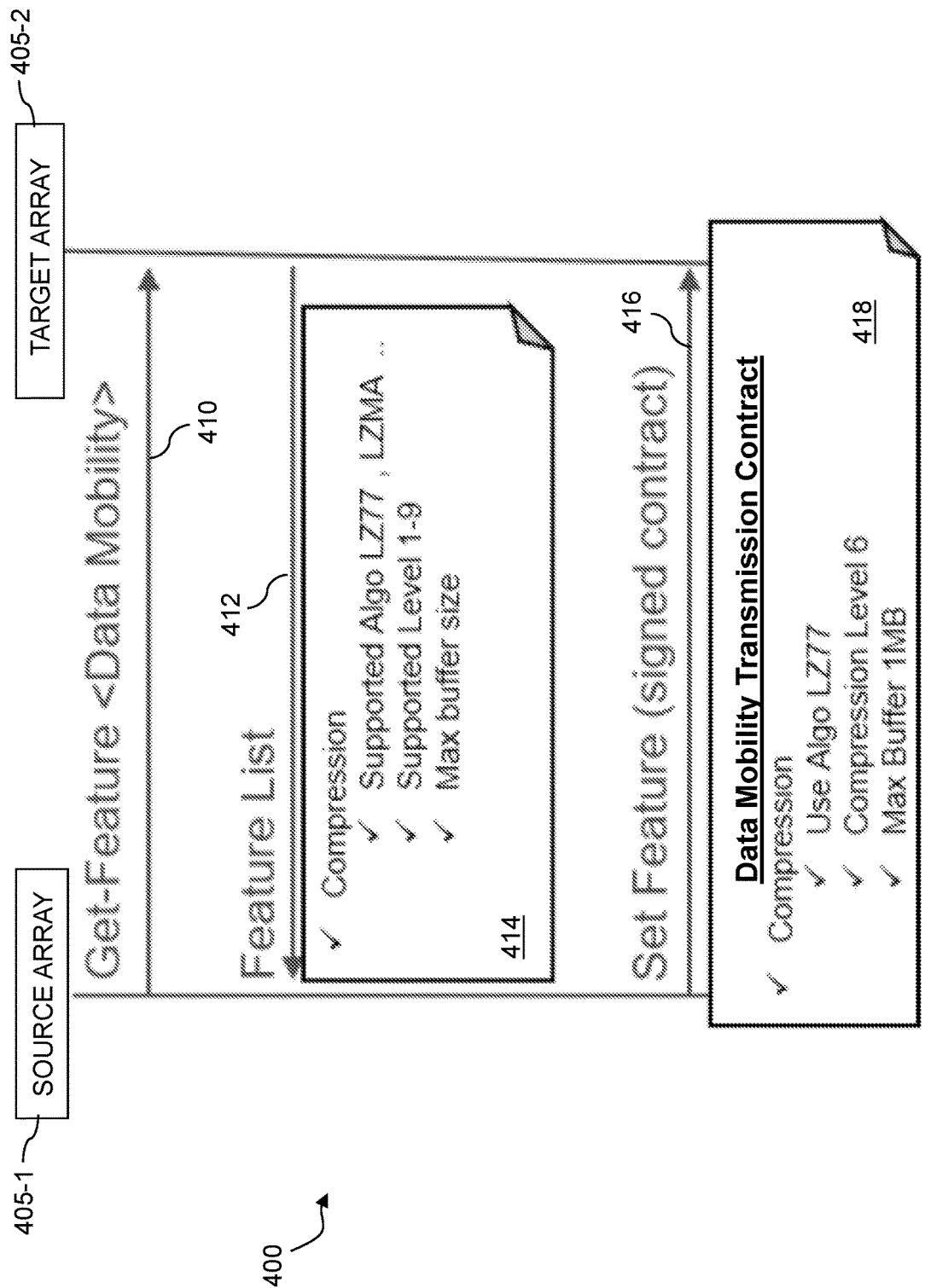
FIG. 4 shows a signaling diagram illustrating an example negotiated replication optimization carried out between source and target arrays utilizing a modified version of an NVMe storage access protocol in an illustrative embodiment.

Referring now to FIG. 4, another example of an information processing system 400 is shown. The system 400 is configured with functionality for negotiated replication optimization in an illustrative embodiment. The system 400 more particularly comprises a source array 405-1 and a target array 405-2, and may include additional components that are not explicitly shown in this figure, such as one or more host devices. This is an example of an embodiment that utilizes a command format of an NVMe storage access protocol, to allow the source array 405-1 to obtain a feature list providing information characterizing one or more replication parameters supported by the target array 405-2.

More specifically, in this embodiment, the source array 405-1 at 410 sends a Get Feature command to the target array 405-2. The Get Feature command is a new and potentially-standardizable command, not currently part of the NVMe storage access protocol but utilizing an NVMe command format. In this embodiment, the Get Feature command is indicated as being directed to obtaining "data mobility" features of the target array 405-2, where such features are examples of what are more generally referred to herein as "replication parameters" of the target array 405-2.

In response to receipt of the Get Feature command from the source array 405-1, the target array 405-2 at 412 sends a feature list 414 back to the source array 405-1, where the feature list in this embodiment provides information characterizing one or more replication parameters supported by the target array 405-2. For example, the information provided by the feature list 414 indicates that the target array 405-2 supports compression, utilizing a range of compression algorithms including LZ77 and LZMA, at levels 1-9, and with a maximum buffer size available for storing decompressed data. Additional or alternative types of information characterizing one or more replication parameters supported by the target array 405-2 can be included in the feature list 414 in other embodiments.

In response to receipt of the feature list from the target array 405-2, the source array 405-1 at 416 sends a Set Feature command to the target array 405-2. The Set Feature command in effect pushes a replication data transmission contract 418 to the target array 405-2. The replication data transmission contract 418 in this embodiment is also illustratively denoted as a "signed contract" and a "data mobility transmission contract" in the figure, as it represents the particular replication parameters supported by the target array 405-2 that have been selected for use by the source array 405-1 in replicating data from the source array 405-1 to the target array 405-2 as part of a replication process. Such an arrangement illustratively represents a type of agreement or contract between the source array 405-1 and the target array 405-2 regarding utilization of the selected parameters for "data mobility" or more generally transmission of data from the source array 405-1 to the target array 405-2 in conjunction with the replication process. For example, the replication data transmission contract 418 more specifically indicates that compression will be utilized in the replication process, based on an LZ77 compression algorithm, at compression level 6, and with a maximum buffer size of 1 megabyte (MB). Other types and arrangements of replication data transmission contracts can be used in other embodiments, and should not be viewed as requiring any type of legally binding or digitally signed agreement between source and target arrays. Instead, the term should be more generally viewed as encompassing a type of informal agreement regarding utilization of particular replication parameters in accordance with the techniques disclosed herein.

Although not explicitly illustrated in the figure, the replication process is then carried out between the source array 405-1 and the target array 405-2 using the particular replication parameters indicated in the replication data transmission contract 418. The negotiated replication optimization can be repeated periodically or under other specified conditions, such as for each of a plurality of different replication sessions, so as to ensure that the replication process continues to utilize an appropriate set of replication parameters.

Again, current versions of the NVMe storage access protocol do not include the particular functionality described above, but that functionality can be readily implemented in a modified version of the NVMe storage access protocol. In other embodiments, the disclosed functionality can be implemented using other types of storage access protocols.

For example, as indicated previously, a modified version of a SCSI storage access protocol as disclosed herein can provide an Inquiry command that is utilized by a source array to obtain a new page providing information characterizing one or more replication parameters supported by a target array.

FIG. 5 shows an example Inquiry page for use in a negotiated replication optimization carried out between source and target arrays utilizing a modified version of a SCSI storage access protocol in an illustrative embodiment.

In this embodiment, the new Inquiry page, also referred to in the context of this example as an INQ page 85h, has the particular format illustrated in the figure, providing information on write compression support and the particular algorithm supported for write compression. More particularly, the INQ page 85h includes a three-bit field, comprising bits 02:00, with a 000 value indicating that compression is not supported, and respective 001, 010 and 011 values indicating that a particular one of three different algorithms are supported by the target array, with the three different algorithms being denoted Algorithm 1, Algorithm 2 and Algorithm 3, as shown. The INQ page 85h can be read by the source array using SCSI INQ commands to obtain the current values of compression-related replication parameters of the target array. Such a page may therefore be used by the target array to "publish" its current compression capabilities to the source array, so that the source array can adapt the manner in which it transfers replication data accordingly, thereby optimizing replication bandwidth.

In some embodiments, the source array further sends a Mode Select command to the second target array, illustratively a Mode Select 55h command, so as to confirm the particular values that will be used in the transfer of replication data, thereby in effect forming a signed data mobility transmission contract between the source and target storage arrays.

As indicated previously, a contract of the type described above can be valid for a given source-target logical storage volume pair, or for sets of multiple such pairs, illustratively associated with a given consistency group of the replication process. Different contracts with different compression-related replication parameters or other replication parameters can therefore be established for different source-target logical storage volume pairs. A given such contract can be valid for the one or more associated logical storage volume pairs for as long as a given replication process or associated replication session is active. It can be periodically renegotiated, possibly within a given replication process (e.g., prior to each significant transfer of replication data) such that the optimal replication parameters continue to be used for the transfer of replication data from the source array to the target array.

The above-described processes, algorithms and other features and functionality disclosed herein are presented by way of illustrative example only, and other embodiments can utilize additional or alternative arrangements. For example, the particular example commands and their contents and formats can be varied in other embodiments. Also, depending on the particular type of replication process, a host device may be involved in the process, and may, for example, send one or more commands of the type described herein to the target storage system to as to determine its currently supported replication parameters.

Also, as mentioned previously, different instances of the above-described processes, algorithms and other techniques for negotiated replication optimization can be performed by different storage controllers or other components in different storage arrays and for different consistency groups and associated replication processes.

Numerous alternative arrangements of these or other features can be used in implementing negotiated replication optimization in other illustrative embodiments.

It is apparent from the foregoing that illustrative embodiments disclosed herein can provide a number of significant advantages relative to conventional arrangements.

For example, some embodiments provide efficient techniques for negotiated optimization of replication bandwidth and/or other replication parameters between source and target storage systems, based at least in part on current values of supported replication parameters of the target storage system as obtained by a source storage system from the target storage system.

As a result, replication process performance is significantly improved, and desired RPOs can be more easily met.

In some embodiments, negotiated replication optimization carried out between source and target storage systems is provided in a consistent and potentially standardizable manner that is applicable to a wide variety of different replication processes and associated source and target storage system configurations, including various types of distributed storage systems comprising respective sets of storage nodes.

Although some embodiments described herein perform negotiated replication optimization in conjunction with various types of compression-related replication parameters, other embodiments can perform negotiated replication optimization using additional or alternative types of replication parameters, such as, for example, encryption-related parameters.

These and other embodiments allow any type of source and target storage systems to efficiently negotiate and optimize replication bandwidth and/or other replication parameters, illustratively utilizing compression, encryption and/or other capabilities, in an automatic, efficient and potentially standardizable manner.

Although certain types of storage access protocols and associated commands are used in illustrative embodiments disclosed herein, other types of protocols and commands can be used in other embodiments.

The disclosed functionality can be implemented using a wide variety of different arrangements of host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include various types of cloud-based systems. Virtual machines provided in such cloud-based systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a central processing unit (CPU), a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 of system 100 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, IO processing logic, replication optimization logic, and additional or alternative components. Also, the particular configurations of system and device elements and associated processing operations illustratively shown in the drawings can be varied in other embodiments. For example, a wide variety of different host device and storage system configurations, and associated negotiated replication optimization techniques, can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to send at least one command to a target storage system;
   to receive, in response to the at least one command, information characterizing one or more replication parameters supported by the target storage system; and
   to configure a replication process to replicate data from a source storage system to the target storage system utilizing at least a particular selected one of the one or more replication parameters supported by the target storage system.

2. The apparatus of claim 1 wherein said at least one processing device comprises at least a portion of the source storage system.

3. The apparatus of claim 1 wherein said at least one processing device comprises at least a portion of a host device coupled to the source storage system and the target storage system.

4. The apparatus of claim 1 wherein the at least one command is sent to the target storage system utilizing a command format of one of an NVMe storage access protocol and a SCSI storage access protocol.

5. The apparatus of claim 1 wherein the at least one command comprises a Get Feature command and the received information comprises a feature list providing the information characterizing the one or more replication parameters supported by the target storage system.

6. The apparatus of claim 1 wherein the at least one command comprises an Inquiry command and the received information comprises a designated page providing the information characterizing the one or more replication parameters supported by the target storage system.

7. The apparatus of claim 1 wherein the information characterizing one or more replication parameters supported by the target storage system comprises information characterizing one or more compression-related replication parameters supported by the target storage system.

8. The apparatus of claim 7 wherein the one or more compression-related replication parameters supported by the target storage system comprise one or more of:
   at least one compression algorithm supported by the target storage system;
   at least one compression level supported by the target storage system; and
   at least one buffer size supported by the target storage system.

9. The apparatus of claim 7 wherein the information characterizing the one or more compression-related replication parameters comprises a range of selectable options for at least one of the one or more compression-related replication parameters supported by the target storage system and the particular selected one of the one or more replication parameters is selected from the range of selectable options.

10. The apparatus of claim 1 wherein the at least one processing device is further configured to push a replication data transmission contract to the target storage system, the replication data transmission contract specifying at least the particular selected one of the one or more replication parameters supported by the target storage system that will be utilized in replicating data as part of the replication process.

11. The apparatus of claim 10 wherein the replication data transmission contract specifies at least one of:
   a particular compression algorithm supported by the target storage system that will be utilized in replicating data as part of the replication process;
   a particular compression level supported by the target storage system that will be utilized in replicating data as part of the replication process; and
   a particular buffer size supported by the target storage system that will be utilized in replicating data as part of the replication process.

12. The apparatus of claim 10 wherein separate instances of the replication data transmission contract are generated by the source storage system and pushed to the target storage system for each of a plurality of source-target logical storage volume pairs that are subject to the replication process.

13. The apparatus of claim 10 wherein the replication data transmission contract is valid once pushed by the source storage system to the target storage system and automatically remains valid for a corresponding replication session of the replication process.

14. The apparatus of claim 1 wherein the information characterizing one or more replication parameters supported by the target storage system comprises information characterizing one or more encryption-related replication parameters supported by the target storage system.

15. A computer program product comprising a non-transitory processor-readable storage medium having stored therein program code of one or more software programs, wherein the program code, when executed by at least one processing device comprising a processor coupled to a memory, causes said at least one processing device:
to send at least one command to a target storage system;
to receive, in response to the at least one command, information characterizing one or more replication parameters supported by the target storage system; and
to configure a replication process to replicate data from a source storage system to the target storage system utilizing at least a particular selected one of the one or more replication parameters supported by the target storage system.

16. The computer program product of claim 15 wherein the at least one command comprises a Get Feature command and the received information comprises a feature list providing the information characterizing the one or more replication parameters supported by the target storage system.

17. The computer program product of claim 15 wherein the at least one command comprises an Inquiry command and the received information comprises a designated page providing the information characterizing the one or more replication parameters supported by the target storage system.

18. A method comprising:
sending at least one command to a target storage system;
receiving, in response to the at least one command, information characterizing one or more replication parameters supported by the target storage system; and
configuring a replication process to replicate data from a source storage system to the target storage system utilizing at least a particular selected one of the one or more replication parameters supported by the target storage system;
wherein the method is performed by at least one processing device comprising a processor coupled to a memory.

19. The method of claim 18 wherein the at least one command comprises a Get Feature command and the received information comprises a feature list providing the information characterizing the one or more replication parameters supported by the target storage system.

20. The method of claim 18 wherein the at least one command comprises an Inquiry command and the received information comprises a designated page providing the information characterizing the one or more replication parameters supported by the target storage system.

* * * * *